April 7, 1953 G. E. SWANSON ET AL 2,634,369

DETECTOR FOR FREQUENCY MODULATION RECEIVERS

Filed June 26, 1947

Inventors:
Glen E. Swanson
Edwin P. Thias
By: Wallace and Cannon
Attorneys.

Patented Apr. 7, 1953

2,634,369

UNITED STATES PATENT OFFICE 2,634,369

DETECTOR FOR FREQUENCY MODULATION RECEIVERS

Glen E. Swanson, Pasadena, and Edwin P. Thias, Hollywood, Calif., assignors to Standard Coil Products Co., Inc., Chicago, Ill., a corporation of Illinois Application June 26, 1947, Serial No. 757,274

3 Claims. (Cl. 250—27)

Figures 1, 2:
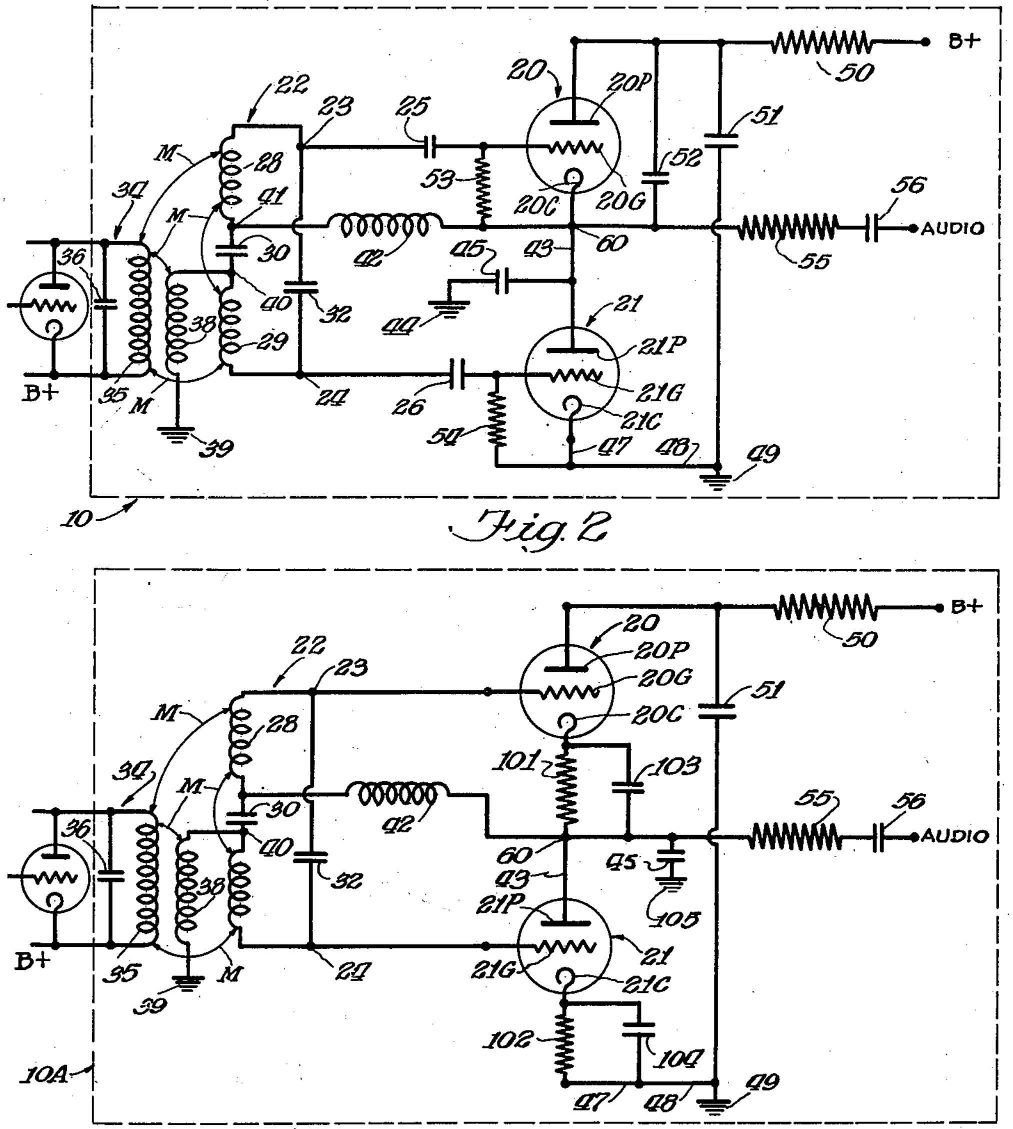

This invention relates to radio receivers and more particularly to detector means of the discriminator type for use in such receivers of the frequency modulation type.

In frequency modulation receivers as heretofore constructed the function of detection has been accomplished by discriminators which have in most instances utilized diodes as the rectifying means, and it has long been recognized that such discriminators inherently involve substantial energy loss. Attempts have been made to avoid such losses by the use of triodes in such discriminators, but in such prior attempts, the operation has not been considered satisfactory insofar as performance characteristics were concerned. In view of this, an important object of the present invention is to enable triodes or other tubes having amplifying characteristics to be employed as the rectifying means in the discriminators of frequency modulated radio receivers in such a way as to produce highly satisfactory detection. Another and related object is to accomplish the foregoing in such a manner that suppression is attained with respect to any undesired amplitude modulations that may be present in the signal when it reaches the discriminator, thereby to attain greater fidelity of reproduction. Another object is to enable a discriminator in which triodes are used to function on the principle of ratio detection. Other objects related to the foregoing are to attain greater sensitivity in frequency modulation discriminators, and to enable such improved results through the use of simple and economical circuits and circuit elements.

Other and further objects of the present invention will be apparent from the following description and claims and are illustrated in the accompanying drawings which, by way of illustration, show preferred embodiments and the principles thereof and what we now consider to be the best mode in which we have contemplated applying those principles. Other embodiments of the invention embodying the same or equivalent principles may be used and structural changes may be made as desired by those skilled in the art without departing from the present invention and the purview of the appended claims.

Figure 3:
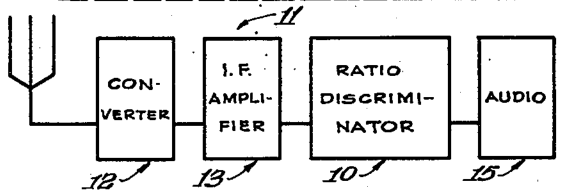

In the drawings:

Figs. 1 and 2 are schematic wiring diagrams illustrating two different embodiments of the discriminator of the present invention; and Fig. 3 is a block diagram indicating the general relationship in which the discriminator of either Fig. 1 or Fig. 2 may be incorporated in a frequency modulation receiver.

For purposes of disclosure the invention has been herein illustrated in Fig. 1 of the drawings as embodied in a ratio discriminator unit 10 which may be utilized as one unit of a frequency modulation receiver 11 that has been illustrated schematically by means of a block diagram in Fig. 3. The receiver 11 shown in Fig. 3 comprises a converter 12, an intermediate frequency amplifier 13, the ratio discriminator unit 10, and an audio section 15, and the units that are thus associated with the discriminator unit 10 may be constructed and related in a conventional manner.

The ratio discriminator unit 10 utilizes a pair of triodes 20 and 21 in attaining its improved F. M. detection, the tube 20 having a plate 20P, a grid 20G and a cathode 20C while the tube 21 has a plate 21P, a grid 21G and a cathode 21C. The grids 20G and 21G are connected to opposite ends of a tuned input or tank circuit 22, as represented by terminals 23 and 24, the connection between the grid 20G and the terminal 23 being afforded by a grid coupling condenser 25 while the connection between the grid 21G and the terminal 24 is afforded by a grid coupling condenser 26.

The tuned input or tank circuit 22 is afforded by a pair of closely coupled inductances 28 and 29 connected by a condenser 30 which has a low reactance at resonant frequency so that the same or substantially the same potential is afforded on both sides of the condenser 30. The other ends of the inductances 28 and 29 are connected respectively to the terminals 23 and 24, and these terminals are also connected by means including a condenser 32. The tank circuit 22 may be tuned to the center frequency by making either the capacitance 32 or the inductances 28 and 29 variable. The tank circuit 22 is inductively coupled with the output of the preceding unit of the receiver by means including a tuned circuit 34 comprising an inductance 35 and a parallel condenser 36 connected across the output of the preceding stage or unit and tuned to resonance at the center frequency by making either inductance 35 or capacitance 36 variable. An inductance 38, tightly coupled with respect to the inductance 35, has one end grounded at 39 while the other end of the inductance 38 is connected to a terminal 40 disposed between the condenser 30 and the inductance 29. The inductances 28 and 29 are both arranged in a mutually inductive relation with respect to the inductance 35, such coupling being adjusted so as to be near the point of critical coupling.

A terminal 41 located between the condenser 30 and the inductance 28, is connected by a choke 42 to the cathode 20C, and this choke 42 has a high impedance at resonant frequency, thereby effectually isolating the cathode 20C with respect to the signal voltage produced at point 41 by inductance 38. The cathode 20C is connected by a conductor 43 to the plate 21P, and is also grounded at 44 through a radio frequency by-pass condenser 45 so as to thereby bring the plate 21P and the cathode 20C to ground potential so far as radio frequency energy may be concerned. The cathode 21C is connected by conductors 47 and 48 to ground at 49.

Across the two tubes 20 and 21 a substantial initial or constant positive voltage is afforded, and for this purpose the plate 20P is connected to the positive side of a B-battery or equivalent source, and this connection is provided through a plate supply filter resistance 50, while a large capacity condenser 51 is connected between the plate 20P and the cathode 21C to filter and store the B-battery energy. A radio frequency by-pass condenser 52 connected between plate 20P and cathode 20C serves as a return path for radio frequency current from plate to cathode for tube 20. Bias for the tube 20 is accomplished by a bias resistor 53 connected between the grid 20G and the cathode 20C, while a resistor 54 connected between the grid 21G and the cathode 21C affords bias for the tube 21. The audio connection is extended from the cathode 20C by an R. F. filter resistance 55 and an audio coupling condenser 56.

Under the present invention the voltages which appear at terminals 23 and 24 vary in magnitude with the magnitude of the signal, and vary in ratio with respect to each other in accordance with frequency deviation from the center frequency. Tubes 20 and 21 are normally biased to operate at a point where the equivalent resistance of each tube is an inverse linear function of the signal voltage applied to the respective grid. This relationship is utilized under the present invention by virtue of the relationship between the signal voltage and resistance of the tubes, individually and with respect to each other.

Thus it must be noted that each tube has a resistance which within workable limits is inversely linear with the voltage variations on the grid of the tube. Applying this relation more specifically to the circuit disclosed in Fig. 1, the tubes 20 and 21 act as varying resistances connected in series by the conductor 43, and across a constant D. C. potential supplied by condenser 51 and such varying resistances are connected to the audio section at a tap or terminal 60 disposed at the cathode 20C. Thus the voltage output at the tap 60 is disposed at such a point in the load circuit that its potential represents the ratio of the voltages appearing at the terminals 23 and 24, and as a result, the voltage output at the terminal 60 represents in its amplitude the frequency deviation of the signal and is not affected by signal strength within reasonable limits since it constitutes a true ratio between the voltages at terminals 23 and 24.

Typical values and designations for the circuit elements of Fig. 1 are as follows:

Condenser 36, 10 micro microfarads
Condenser 32, 50 micro microfarads

Condenser 25, .01 micro microfarad
Condenser 26, .01 micro microfarad
Condenser 30, 1000 micro microfarads
Condenser 45, 500 micro microfarads
Condenser 52, 500 micro microfarads
Condenser 51, 4 microfarads to 8 microfarads
Condenser 56, .01 microfarad
Inductance 35, 25 microhenries
Inductance 38, 7 microhenries
Inductances 28 and 29, 10 microhenries—broken in center and 2 leads (40 and 41) brought out
Choke 42, choke self resonant at center frequency
Resistance 53, 10 megohms
Resistance 54, 10 megohms
Resistance 50, 100,000 ohms
Resistance 55, 50,000 ohms
Triode 20, one section of 7F8 tube
Triode 21, other section of 7F8 tube In Fig. 2 of the drawings an alternative embodiment of the invention has been illustrated. In this alternative embodiment a ratio discriminating detector unit 10A is afforded which in its theory of operation is identical with the detector 10A of Fig. 1, and the difference between these two embodiments lies in the method of obtaining proper bias of the tubes. Thus the same reference characters have been applied in Fig. 2 to those elements which correspond with elements in Fig. 1. It will be observed however that the resistances 53 and 54 and the condensers 25 and 26 have been eliminated in Fig. 2, and a different bias arrangement has been employed. Thus the terminal 60 is connected to the cathode 20C by a bias resistor 101, while the conductor 47 is connected to the cathode 21C by a bias resistor 102. By-pass condensers 103 and 104 are connected respectively across the resistances 101 and 102 so as to prevent audio degeneration in the cathode circuits of the respective tubes. In Fig. 2 it will also be noted that the radio frequency by-pass condenser 45 is connected from the audio lead adjacent tap 60 to ground at 105, thus differing somewhat from the arrangement shown in Fig. 1.

The circuit values and designations for corresponding elements in the two embodiments are the same as hereinbefore set forth, and for the different circuit elements, the following values may be employed:

| | |
|---|---|
| Resistor 101 | 5000 ohms. |
| Resistor 102 | 5000 ohms. |
| Condenser 103 | 10 to 24 microfarads. |
| Condenser 104 | 10 to 24 microfarads. |

While there may be differences of opinion as to the theory of operation of the present detector unit, particularly insofar as the manner in which it attains its A. M. suppressing characteristics, and as to the particular way in which it attains its ratio detecting action, we have found that with the circuit arrangements and values thereinbefore set forth, such operating characteristics are in fact attained. In an actual test where the present detector unit was incorporated in a receiver to replace the usual F. M. section thereof, it was found that six tubes and the related circuit elements of the original set could be replaced by three tubes and the associated circuit elements; and even with this marked reduction in material and labor costs, the quality of reproduction was considered to be extremely good.

From the foregoing description it will be evident that the present invention enables triodes or other tubes having amplifying characteristics to be employed in F. M. receivers in such a way as to avoid power losses while at the same time attaining highly satisfactory detection. Moreover, it will be evident that through the utilization of triodes or other tubes having similar amplifying characteristics in the manner taught by the present invention, suppression of undesired amplitude modulations is attained in such a way as to materially simplify the receiver construction. With the advantageous arrangement thus afforded the construction of an F. M. receiver is, of course, simplified, since it not only enables the usual limiter circuits to be eliminated but also enables the I. F. amplification to be simplified. Under the present invention, the detection is attained on the principle of ratio detection, thereby to minimize the effects of variation in signal strength, and with the present detector the triodes or the like function through reliance upon the varying resistance characteristics of such tubes so as to attain great sensitivity as well as high fidelity.

Thus, while we have illustrated and described the preferred embodiments of our invention, it is to be understood that this is capable of variation and modification and we therefore do not wish to be limited to the precise details set forth, but desire to avail ourselves of such changes and alterations as fall within the purview of the following claims.

We claim:

1. In a detector for frequency modulated radio receivers, a tank circuit resonant at center frequency and having a pair of secondary inductances connected in series through an isolating condenser which will prevent flow of direct current, and also having a condenser forming the capacitance of the tank circuit and connected at terminals to the other ends of said inductances, a primary inductance and a capacitance forming an input circuit tuned to center frequency, a tertiary coupling element grounded at one end and connected at the other end to one side of said isolating condenser, a pair of triodes each having a grid and an anode and a cathode, and having their grids connected respectively to said terminals, means including an intermediate output terminal connecting the plate of one of said tubes with the cathode of the other tube in series, means including a choke of high impedance at resonant frequency and connecting said intermediate output terminal with the other side of said isolating condenser, means connecting the cathode of said one tube and the plate of said other tube together and including a large capacity storage and filter condenser, an audio connection extended from said intermediate output terminal, and means operable to supply a constant high value positive plate potential to the plate of said other tube.

2. In a detector for frequency modulated radio receivers, a tank circuit resonant at center frequency and having a pair of secondary inductances connected in series through an isolating condenser which will prevent flow of direct current, and also having a condenser forming the capacitance of the tank circuit and connected at terminals to the other ends of said inductances, a primary inductance and a capacitance forming an input circuit tuned to center frequency, a tertiary coupling element grounded at one end and connected at the other end to one side of said isolating condenser, a pair of triodes each having a grid and an anode and a cathode, and having their grids connected respectively to said terminals, means including an intermediate output terminal connecting the plate of one of said tubes with the cathode of the other tube in series, means including a choke of high impedance at resonant frequency and connecting said intermediate output terminal with the other side of said isolating condenser, means connecting the cathode of said one tube and the plate of said other tube together and including a large capacity storage and filter condenser, an audio connection extended from said intermediate output terminal, means operable to afford a high positive plate potential to the plate of said other tube, cathode bias means for the respective tubes, and a condenser connected to ground from said intermediate output terminal to bring the electrically adjacent cathode and plate to ground potential so far as radio frequency energy is concerned.

3. In a detector for frequency modulated radio receivers, a tank circuit resonant at center frequency and having a pair of secondary inductances connected in series through an isolating condenser which will prevent flow of direct current, and also having a condenser forming the capacitance of the tank circuit and connected at terminals to the other ends of said inductances, a primary inductance and a capacitance forming an input circuit tuned to center frequency, a tertiary inductance grounded at one end and connected at the other end to one side of said isolating condenser, a pair of triodes each having a grid and an anode and a cathode and having their grids connected respectively to said terminals, means including an intermediate output terminal connecting the plate of one of said tubes with the cathode of the other tube in series, means having high impedance at resonant frequency and connecting said intermediate output terminal with the other side of said isolating condenser, means connecting the cathode of said one tube and the plate of said other tube together and including a large capacity storage and filter condenser, an audio connection extended from said intermediate output terminal, and means operable to afford a high positive plate potential to the plate of said other tube.

GLEN E. SWANSON.
EDWIN P. THIAS.

REFERENCES CITED

The following references are of record in the file of this patent:

UNITED STATES PATENTS

| Number | Name | Date |
|---|---|---|
| 1,867,567 | Hansell | July 19, 1932 |
| 2,282,105 | Tunick | May 5, 1942 |
| 2,351,212 | Houghton | June 13, 1944 |
| 2,364,761 | Schade | Dec. 12, 1944 |
| 2,412,482 | Vilkomerson | Dec. 10, 1946 |
| 2,413,977 | Kock | Jan. 7, 1947 |
| 2,420,268 | Sontheimer | May 6, 1947 |
| 2,435,414 | Sziklai et al. | Feb. 3, 1948 |
| 2,495,023 | Sebring et al. | Jan. 17, 1950 |